(12) United States Patent
Rosemeier et al.

(10) Patent No.: US 7,507,178 B2
(45) Date of Patent: Mar. 24, 2009

(54) TRANSMISSION UNIT

(75) Inventors: Thomas Rosemeier, Meckenbeuren (DE); Ulrich Mair, Friedrichshafen (DE); Detlef Baasch, Ailingen (DE); Christoph Pelchen, Tettnang (DE)

(73) Assignee: ZF Friedrichshafen AG, Friedrichshafen (DE)

(*) Notice: Subject to any disclaimer, the term of this patent is extended or adjusted under 35 U.S.C. 154(b) by 91 days.

(21) Appl. No.: 11/581,903

(22) Filed: Oct. 17, 2006

(65) Prior Publication Data

US 2007/0087889 A1 Apr. 19, 2007

(30) Foreign Application Priority Data

Oct. 18, 2005 (DE) ........................ 10 2005 049 706

(51) Int. Cl.
*F16H 37/08* (2006.01)

(52) U.S. Cl. ...................................... 475/205; 180/248

(58) Field of Classification Search ................... 475/18, 475/21, 22, 23, 903; 180/248, 249
See application file for complete search history.

(56) References Cited

U.S. PATENT DOCUMENTS 4,976,347 A * 12/1990 Sakakibara et al. ......... 180/249
6,830,529 B2 * 12/2004 Phelan et al. ............... 475/221

FOREIGN PATENT DOCUMENTS

| DE | 40 24 063 A1 | 1/1992 |
|---|---|---|
| DE | 102 49 557 A1 | 5/2004 |
| DE | 103 48 960 A1 | 5/2005 |
| EP | 0 413 436 A1 | 2/1991 |
| JP | 2001-039179 A | 2/2001 |

* cited by examiner

*Primary Examiner*—Roger L Pang
*Assistant Examiner*—Derek D Knight
(74) *Attorney, Agent, or Firm*—Davis & Bujold, P.L.L.C.

(57) ABSTRACT

A transmission unit (7) with a housing (9), a transmission input shaft (10) and three transmission output shafts (11, 12, 13), at least two planetary gearsets (14, 15) and a device (16) arranged between two actively interconnected shafts (14A, 15A) of the planetary gearsets for variable distribution of torque delivered by the transmission input shaft between two of the three transmission output shafts is described. A web (14D) of the first planetary gearset is formed with a differential cage (19A) of a differential (19), which is provided in order to distribute part of the torque which is delivered by the transmission shaft that has been passed on to the two of the transmission output shafts between the two transmission output shafts.

15 Claims, 3 Drawing Sheets

TRANSMISSION UNIT

This application claims priority from German Application Serial No. 10 2005 049 706.3 filed Oct. 18, 2006.

FIELD OF THE INVENTION

The invention concerns a transmission unit.

BACKGROUND OF THE INVENTION

From DE 103 48 960 A1 a transmission unit is known for the distribution of a drive torque to at least two drive output shafts with at least two, at least three-shaft planetary gearsets. One respective shaft of one gearset is connected to a drive input shaft. Furthermore, one respective shaft of each planetary gearset is one of the drive output shafts, and in each case at least one other shaft of a planetary gearset is in active connection with a shaft of another planetary gearset. An operating-condition-dependent torque in one shaft can be supported as a function of an operating condition of the respective other shaft actively connected thereto via the active connection, in such manner that if there is a rotation speed difference between the drive output shafts, a torque that changes the speed difference is applied via the active connection to the planetary gearsets.

The known transmission unit makes it possible to distribute a drive torque from a drive engine in a drive train of a vehicle, according to need and in relation to the operating situation, in the longitudinal direction of the vehicle between two vehicle axles with a variable degree of distribution or in the transverse direction of the vehicle between the wheels of an axle of a vehicle with a variable degree of distribution.

The use of the transmission unit in an all-wheel-drive vehicle for the variable distribution of a torque in the vehicle's longitudinal direction between two vehicle axles of the vehicle requires, in each case in the area of the vehicle axles, devices by means of which the torque respectively delivered to each vehicle axle can be distributed in the vehicle's transverse direction between the two wheels on a vehicle axle.

Particularly when the transmission device is used in a front-transverse-drive all-wheel vehicle, in which it is desired that the distribution of the drive torque from the engine should be freely adjustable between the front and rear axles of the vehicle, because of the arrangement of the transmission unit as an overlap transmission and that of an axle differential for distributing that part of the drive torque delivered to the front axle of the vehicle in the vehicle's transverse direction between the wheels of the transverse vehicle axle, more structural space is needed in an area of the vehicle in which the drive engine, a gearshift transmission and the front axle of the vehicle are already accommodated.

Of course, the same problem also arises in an all-wheel-drive vehicle in which the drive engine, together with a gearshift transmission, are arranged in the area of the vehicle's rear axle.

Accordingly, the purpose of the invention is to provide a transmission unit which is characterized by taking up less structural space compared with transmission units known from the prior art.

SUMMARY OF THE INVENTION

The transmission unit of the present invention is made with a housing, a transmission input shaft and three transmission output shafts, two planetary gearsets, and with a device arranged between two actively interconnected shafts of the planetary gearsets for the variable distribution of the torque delivered by the transmission input shaft between two of the transmission output shafts.

According to the invention a web of the first planetary gearset is made with a differential cage of a differential provided in order to distribute that part of the torque coming from the transmission input shaft which is delivered to two of the transmission output shafts, between the said two transmission output shafts.

This makes it possible in a simple way to combine an axle differential for distributing a torque in the vehicle's transverse direction between two wheels of a vehicle axle in a structurally space-saving way with the transmission unit made as an overlap transmission, and for example to construct them as a module which can be fitted in an assembly process during the manufacture of a motor vehicle.

In an advantageous further development of the transmission unit according to the invention, the differential or axle differential for distributing the torque delivered to a vehicle axle in the vehicle's transverse direction is arranged in the housing of the transmission unit of the invention, which results in an extremely compact structural form and a further reduction of the space occupied, since the differential can be made without a housing of its own.

BRIEF DESCRIPTION OF THE DRAWINGS

The invention will now be described, by way of example, with reference to the accompanying drawings. For the sake of greater clarity, in the description of the various example embodiments components with the same structure and function are denoted by the same indices. The drawings show.

DETAILED DESCRIPTION OF THE INVENTION

Figure 1:
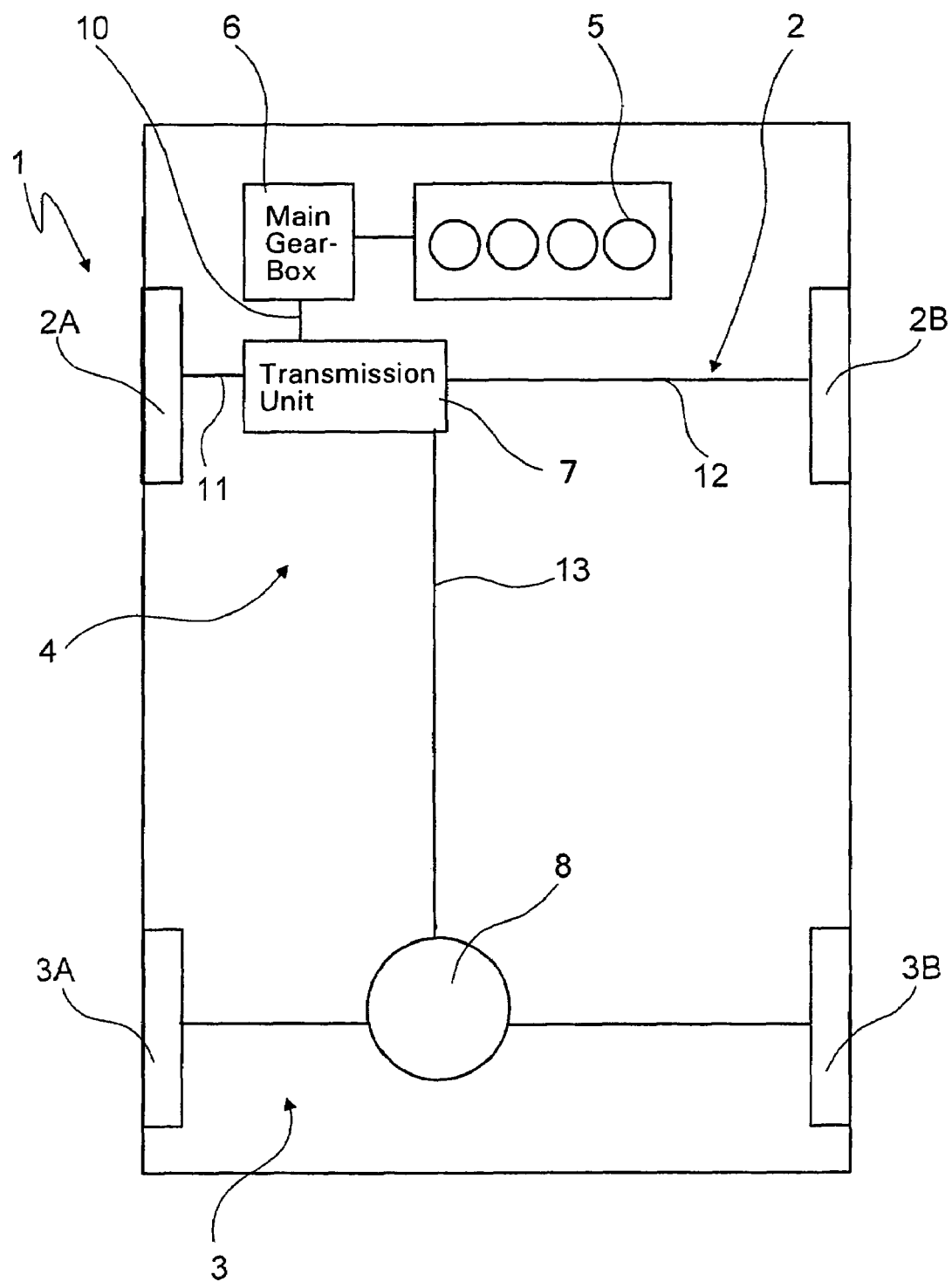
FIG. 1 is schematic representation of a drive train of an all-wheel drive vehicle.

FIG. 1 shows a schematic representation of an all-wheel drive vehicle 1 with two vehicle axles 2, 3 which are part of a drive train 4 of the all-wheel drive vehicle 1. The drive train 4 also comprises a drive engine or internal combustion engine 5, whose crankshaft (not shown in detail) extends in the transverse direction of the vehicle. In addition, the drive train 4 is made with a main gearbox 6 which can be any gearbox known in itself from the field of practice and which is provided for the engagement of various stepped and/or continuously variable transmission ratios.

Between the main gearbox 6 and the vehicle axles 2, 3 of the all-wheel-drive vehicle 1, which in a known way are connected on the respective sides of the vehicle with at least one drive wheel 2A, 2B and 3A, 3B, is arranged a transmission unit 7 made as an overlap transmission for distributing the drive torque from the drive engine 5 or a transmission output torque from the main gearbox 6 in the vehicle's longitudinal direction between the two vehicle axles 2 and 3.

In addition, besides the distribution of the transmission output torque from the main gearbox 6 provided for in the vehicle's longitudinal direction, in the area of the vehicle axle 2 that part of the transmission output torque which is delivered to the axle 2 is distributed in the vehicle's transverse direction between the two wheels 2A and 2B on the vehicle axle 2.

In contrast, the fraction of the transmission output torque from the main gearbox 6 which is delivered to the vehicle axle 3 is distributed by a device 8 provided in the area of the vehicle axle 3 for equalizing speed differences between the wheels 3A and 3B of the axle 3. In the present case the device 8 is made as a transverse transfer box or axle transmission, by way of which the drive torque delivered to the vehicle axle 3 is distributed essentially in equal parts between the two wheels 3A and 3B.

For this, the device 8 is made as a transverse transfer box or axle transmission known in itself, which enables the drive wheels 3A and 3B of the vehicle axle 3 to be driven independently of one another at different speeds in accordance with the different path lengths of the left and right tracks, whereby the drive torque can be distributed symmetrically and thus without any yaw torque between the two drive wheels on the axle 3.

Figure 2:
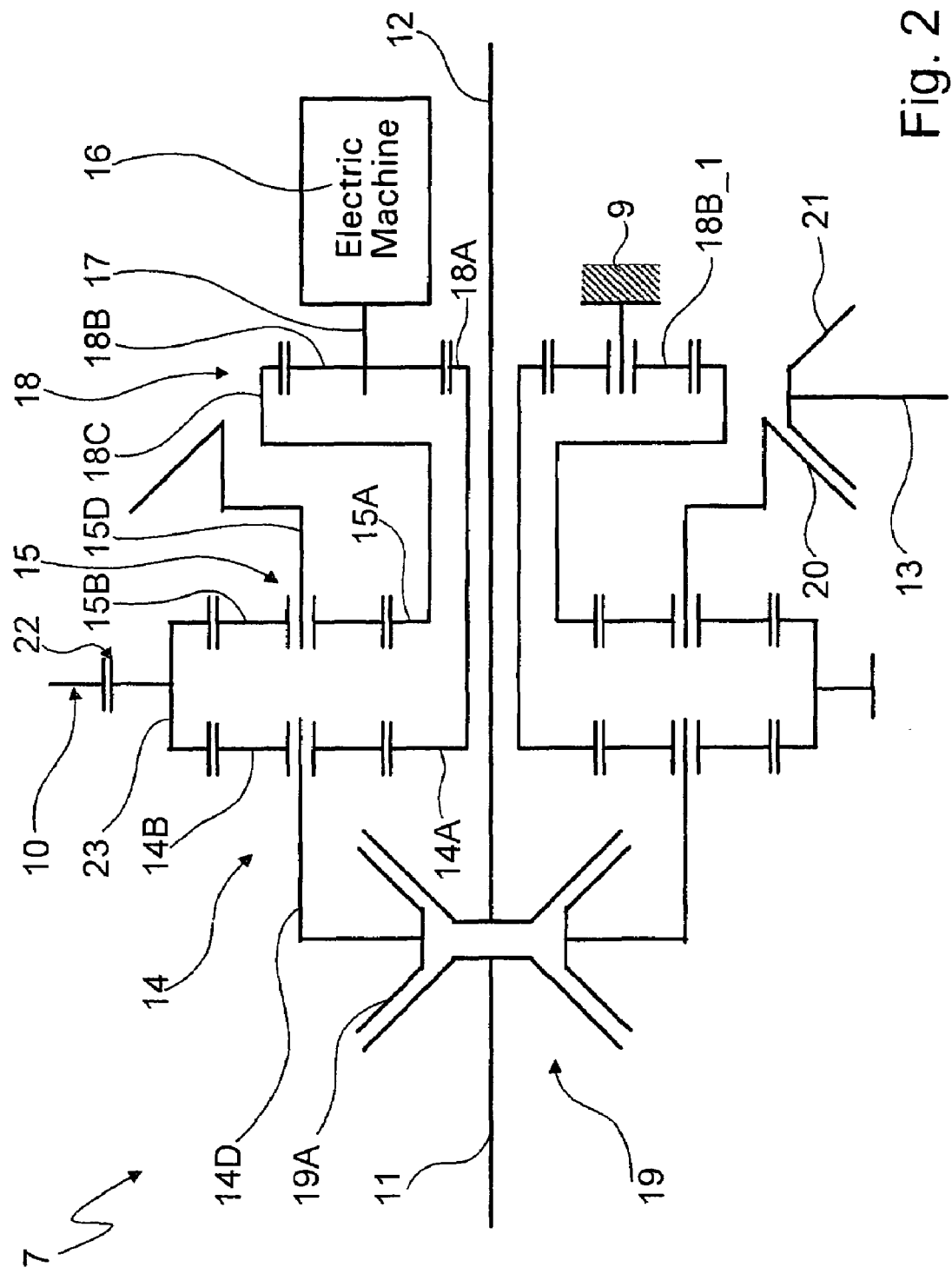
FIG. 2 is a gearing layout of a transmission unit according to the invention made as an overlap transmission, constructed with a device made as an electric motor for the variable distribution of the torque delivered from the transmission input shaft between two of the transmission output shafts.

FIG. 2 shows a gearing layout of a first example embodiment of the transmission unit 7 represented only schematically in FIG. 1, which comprises a housing 9, a transmission input shaft 10 and three transmission output shafts 11, 12 and 13, with two planetary gearsets 14 and 15 and with a device 16 arranged between the two actively interconnected shafts 14A and 15A of the planetary gearsets 14 and 15 for the variable distribution of the torque coming from the transmission input shaft 10 between the transmission input shafts 11 and 12 and the transmission output shaft 13.

The transmission output shafts 11 and 12 are respectively actively connected to the wheels 2A and 2B of the vehicle axle 2 in this case constituting the front axle of the vehicle. The third transmission output shaft 13 leads from the transmission unit 7 to the device 8 associated with the second vehicle axle 3, in this case the rear axle of the vehicle.

The device 16 for variably distributing the torque coming from the transmission input shaft 10 is in this case made as an electric motor, which is connected via its motor output shaft 17 with a satellite gear 18B of a third planetary gearset 18. The third planetary gearset 18 is in fixed connection via its solar gear 18A with the solar gear 14A of the first planetary gearset 14 and via its annular gear 18C with the solar gear 15A of the second planetary gearset 15. A further satellite gear 18B_1 or several satellite gears of the third planetary gearset 18 is/are mounted to rotate on the housing 9 of the transmission unit 7.

A web 14D of the first planetary gearset 14 is formed with a differential cage 19A of a differential 19, which is provided in order to distribute the part of the torque from the transmission input shaft 10 delivered to the transmission output shafts 11 and 12 in equal measure between the two transmission output shafts 11 and 12.

This means that the differential 19 has essentially the same function as the device 8 and, therefore, also enables the drive wheels 2A and 2B on vehicle axle 2 to be driven independently of one another at different speeds in accordance with the different path lengths of the left and right tracks, whereby the drive torque can be distributed symmetrically and thus without any yaw torque between the two drive wheels 2A and 2B on the vehicle axle 2.

A web 15D of the second planetary gearset 15 is formed with a bevel gear 20, which meshes with another bevel gear 21 connected to the third transmission output shaft 13.

The transmission output torque from the main gearbox 6 delivered by the transmission output shaft 10 is passed via spur gearing 22 to a common annular gear 23 of the first planetary gearset 14 and the second planetary gearset 15. From there, the transmission output torque from the main gearbox 6 is passed to satellite gears 14B and 15B engaged with the annular gear 23, these being respectively mounted to rotate on the webs 14D and 15D of the planetary gearsets 14 and 15 and the two webs 14D and 15D being driven by virtue of their rolling movement in the annular gear 23.

The two webs 14D and 15D of the planetary gearsets 14 and 15 are, in turn, connected to the transmission output shafts 11, 12 or 13 respectively, so that the transmission output torque from the main gearbox 6 passes on to the transmission output shafts 11 to 13, via the spur gearing 22, the annular gear 23, the satellite gears 14B and 15B and the webs 14D and 15D, with degrees of distribution determined by the electric motor 16.

When the electric motor 16 is not energized, the transmission output torque from the main gearbox 6 delivered by the transmission input shaft 10 is distributed between the third transmission output shaft 13 and the two transmission output shafts 11 and 12 as a function of a basic distribution of the transmission unit 7, this basic degree of distribution being determined by the ratio of the number of teeth on the annular gear 18C to the number of teeth on the solar gear 18A of the third planetary gearset 18. This basic degree of distribution is multiplied, as a function of the torque applied by the electric motor, by a factor determined by the ratio between the number of teeth on the annular gear 23 of the first planetary gearset 14 and the second planetary gearset 15 and the number of teeth on the solar gears 14A and 15A of the two planetary gearsets, and shifted in the direction of an upper or lower limit value of the degree of distribution.

The combination of the web 14D of the first planetary gearset 14 with the differential cage 19A of the differential 19 is a very space-saving design solution for the transmission unit 7 since the differential 19, which is essentially a conventional axle differential, can simply be integrated in the housing 9 of the transmission unit 7 and need not be made with a housing of its own. In addition, the second transmission output shaft 12, extending in the vehicle's transverse direction, can simply pass centrally through the solar gears 14A, 15A and 18A of the three planetary gearsets 14, 15 and 18 which, in this case, are made as hollow shafts, which is not possible in conventional front-transverse- or rear-transverse-drive all-wheel vehicles, because the axle transmission and overlap transmission, usually made as separate structural groups, cannot be positioned relative to one another in the necessary way during assembly or only so by adopting cost-intensive measures.

Figure 3:
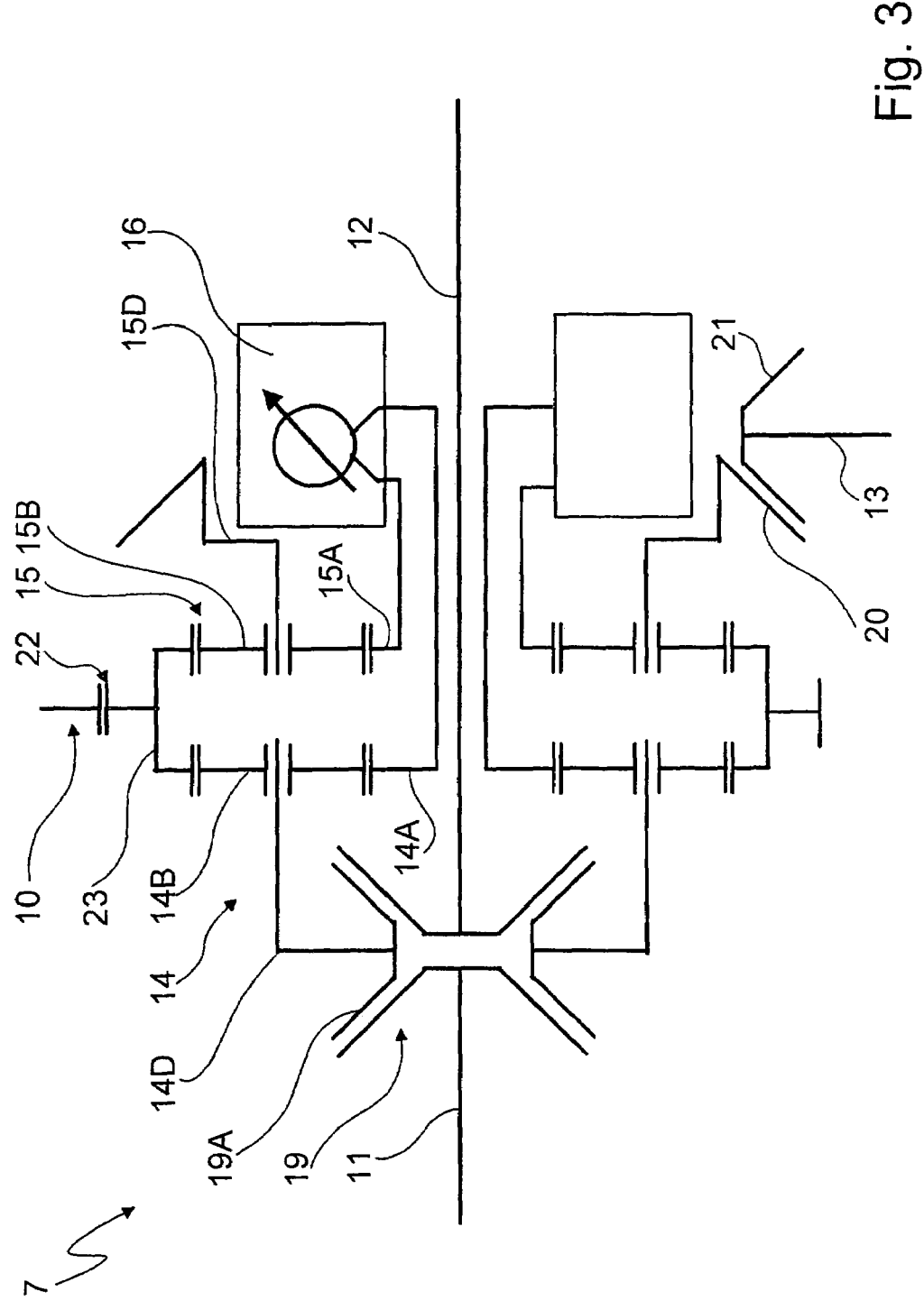
FIG. 3 is a gearing layout of a second example embodiment of a transmission unit of an all-wheel drive vehicle as in FIG. 1, such that the device for the variable distribution of the torque coming from the transmission input shaft between two of the transmission output shafts is made as a continuously variable transmission device.

FIG. 3 shows a gearing layout of a second example embodiment of the transmission unit 7, which differs from the first example embodiment shown in FIG. 2 essentially in the area of the device 16 for variably distributing the torque from the transmission input shaft 10 between the third output shaft 13 and the two output shafts 11 and 12, in that in the second example embodiment shown in FIG. 3, the transmission unit 7 is made as a continuously variable transmission unit and is constructed without the third planetary gearset 18.

In this case, the continuously variable transmission unit is made as a tension medium transmission, for example a wrap-around CVT (Continuously Variable Transmission). Of course, the continuously variable transmission unit could also be made as a ball variator, a dual variator or such like.

The integration of the continuously variable transmission unit between the solar gears 14A and 15A of the first two planetary gearsets makes it possible to vary a degree of distribution of the transmission output torque from the main gearbox 6 between the third transmission output shaft 13 and the two output shafts 11 and 12 of the transmission unit 7 by a corresponding adjustment of the transmission ratio of the device 16 between an upper limit value and a lower limit value, beginning from the basic degree of distribution of the transmission unit 7.

REFERENCE NUMERALS 1 all-wheel drive vehicle
2 vehicle axle
2A, 2B drive wheels
3 vehicle axle
3A, 3B drive wheels
4 drive train
5 drive engine, internal combustion engine
6 main gearbox
7 transmission unit
8 device
9 housing of the transmission unit
10 transmission input shaft
11 first transmission output shaft
12 second transmission output shaft
13 third transmission output shaft
14 first planetary gearset
14A solar gear
14B satellite gear
14D web
15 second planetary gearset
15A solar gear
15B satellite gear
15D web
16 device/electric machine
17 motor output shaft
18 third planetary gearset
18A solar gear
18B satellite gear
18B_1 satellite gear
18C annular gear
19 differential
19A differential cage
20 bevel gear
21 other bevel gear
22 spur gearing
23 annular gear

The invention claimed is:

1. A transmission unit (7) comprising:
a housing (9),
a transmission input shaft (10),
first, second and third transmission output shafts (11, 12, 13),
at least first and second planetary gearsets (14, 15) with each comprising a solar sear, an annular gear, and a web (14D, 15D) supporting a plurality of planet gears which mesh with the solar gear and the annular gear,
a device (16) being arranged between first and second actively interconnected shafts (14A, 15A) of at least the first and the second planetary gearsets (14, 15) for variable distribution of torque delivered by the transmission input shaft (10) between the first, the second and the third transmission output shafts (11, 12, 13),
the web (14D) of the first planetary gearset (14) being connected to a differential cage (19A) of a differential (19) which is provided to distribute a portion of the torque which is delivered by the transmission input shaft (10) to the first and the second transmission output shafts (11, 12), and
the differential (19) being located between the first and the second transmission output shafts (11 and 12).

2. The transmission unit according to claim 1, wherein the differential (19) is located in the housing (9).

3. The transmission unit according to claim 1, wherein the web (15D) of the second planetary gearset (15) has a bevel gear (20) which meshes with another bevel gear (21) connected to the third transmission output shaft (13).

4. The transmission unit according to claim 3, wherein the device (16) for variably distributing the torque, by the transmission input shaft (10) between the first, the second and the third transmission output shafts (11, 12 and 13), is arranged between the solar gears (14A, 15A) of at least the first and the second planetary gearsets (14, 15).

5. The transmission unit according to claim 1, wherein the device (16) is an electric motor and a degree of distribution of the torque is varied as a function of torque produced by the electric motor (16).

6. The transmission unit according to claim 1, wherein the device (16) is a continuously variable transmission and a degree of distribution of the torque is varied as a function of a transmission ratio of the continuously variable transmission device (16).

7. The transmission unit according to claim 1, wherein the first and the second planetary gearsets (14, 15) have the same transmission ratio.

8. A transmission unit (7) for incorporation into an all-wheel-drive vehicle (1) having a drive engine (5), the transmission unit (7) being arranged in a transverse direction of the vehicle and comprising:
a housing (9);
a transmission input shaft (10);
first, second and third transmission output shafts (11, 12, 13);
at least first and second planetary gearsets (14, 15) with each of the first and the second planetary gearset comprising a solar gear, an annular gear and a web (14D, 15D) supporting a plurality of planet gears which mesh with the solar gear and the annular gear;
a device (16) being arranged between first and second actively interconnected shafts (14A, 15A) of the first and the second planetary gearsets (14, 15) for variable distribution of torque delivered by the transmission input shaft (10) between the first, the second and the third transmission output shafts (11, 12, 13);
the solar gear of the first planetary gearset (14) being connected to the first actively interconnected shaft (14A) while the solar gear of the second planetary gearset (15) being connected to the second actively interconnected shaft (15A);
the web (14D) of the first planetary gearset (14) being connected to a differential cage (19A) of a differential (19) provided for distribution of a portion of the torque which is delivered by the transmission input shaft (10) to the first and the second transmission output shafts (11, 12); and
the differential (19) being located between the first and the second transmission output shafts (11 and 12).

9. The transmission unit according to claim 8, wherein the device (16) is an electric motor and a degree of distribution of the torque is varied as a function of torque produced by the electric motor (16).

10. The transmission unit according to claim 8, wherein the first and the second planetary gearsets (14, 15) have the same transmission ratio.

11. A transmission unit (7) for vehicle (1), the transmission unit (7) comprising:
- a transmission input shaft (10);
- first, second and third transmission output shafts (11, 12, 13);
- first and second planetary gearsets (14, 15) with each of the first and the second planetary gearset comprising a solar gear, an annular gear and a web (14D, 15D) supporting a plurality of planet gears which mesh with the solar gear and the annular gear;
- a device (16) being arranged between a first actively interconnected shaft (14A) coupled to the solar gear of the first planetary gearset (14) and a second actively interconnected shaft (15A) coupled to the solar gear of the second planetary gearset (15) for variable distribution of torque delivered by the transmission input shaft (10) between the first, the second and the third transmission output shafts (11, 12, 13);
- the web (14D) of the first planetary gearset (14) being connected to a differential cage (19A) of a differential (19) for distribution of a portion of the torque which is delivered by the transmission input shaft (10) to the first and the second transmission output shafts (11, 12);
- the differential (19) being located between the first and the second transmission output shafts (11 and 12); and
- the web (15D) of the second planetary gearset (15) supplying output drive to the third transmission output shaft (13).

12. The transmission unit according to claim 11, wherein the web (15D) of the second planetary gearset (15) has a bevel gear (20) which meshes with another bevel gear (21) connected to the third transmission output shaft (13).

13. The transmission unit according to claim 11, wherein the device (16) is an electric motor and a degree of distribution of the torque is varied as a function of torque produced by the electric motor (16).

14. The transmission unit according to claim 11, wherein the first and the second planetary gearsets (14, 15) have the same transmission ratio.

15. The transmission unit according to claim 11, wherein the web (15D) of the second planetary gearset (15) has a bevel gear (20) which meshes with another bevel gear (21) connected to the third transmission output shaft (13).

* * * * *